(12) United States Patent
Scheetz

(10) Patent No.: US 7,267,414 B2
(45) Date of Patent: *Sep. 11, 2007

(54) SUSPENSION SYSTEM, POSITIVE DRIVE BELT SYSTEM AND BELT TENSIONING DEVICE FOR WHEEL AND BELT DRIVEN DEVICES

(75) Inventor: Timothy R. Scheetz, Peoria, IL (US)

(73) Assignee: Scheetz, Inc., Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/068,543

(22) Filed: Feb. 28, 2005

(65) Prior Publication Data

US 2005/0206237 A1   Sep. 22, 2005

Related U.S. Application Data

(63) Continuation of application No. 10/608,656, filed on Jun. 27, 2003, now Pat. No. 6,860,571.

(60) Provisional application No. 60/392,155, filed on Jun. 27, 2002.

(51) Int. Cl.
*B62D 55/14* (2006.01)

(52) U.S. Cl. ............ 305/129; 305/130; 305/141
(58) Field of Classification Search ............ 305/143, 305/145, 140, 141, 120, 123, 129, 130, 131
See application file for complete search history.

(56) References Cited

U.S. PATENT DOCUMENTS

| | | | |
|---|---|---|---|
| 1,297,104 A * | 3/1919 | Colahan | 305/134 |
| 2,461,849 A | 2/1949 | Slemmons et al. | |
| 4,087,135 A * | 5/1978 | Unruh | 305/125 |
| 4,881,609 A | 11/1989 | Purcell et al. | |
| 4,957,332 A * | 9/1990 | Batelaan | 305/185 |
| 5,279,378 A | 1/1994 | Grawey et al. | |
| 5,622,234 A * | 4/1997 | Nagorcka et al. | 180/9.5 |
| 5,975,226 A | 11/1999 | Matsumoto et al. | |
| 6,283,241 B1 * | 9/2001 | Kubota | 180/193 |
| 6,315,374 B1 | 11/2001 | Johansson | |
| 6,715,575 B2 | 4/2004 | Karpik | |

* cited by examiner

*Primary Examiner*—Russell D. Stormer
(74) *Attorney, Agent, or Firm*—Thompson Coburn LLP; Kevin M. Kercher, Esq.

(57) ABSTRACT

A track driven device having a suspension system, positive hydraulic braking system, positive drive belt system and belt tensioning system for an improved ride, reducing belt wear and belt failure.

12 Claims, 14 Drawing Sheets

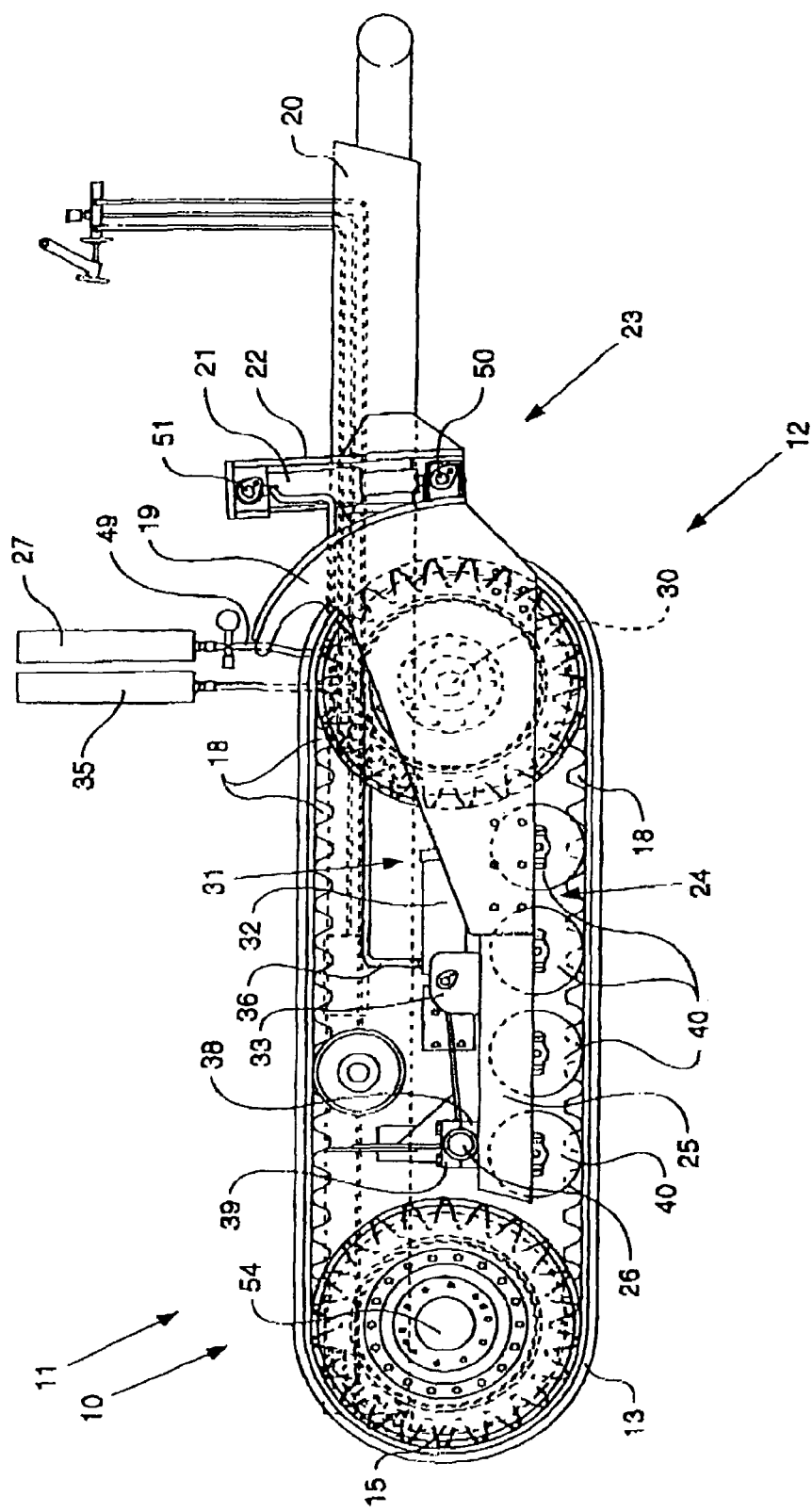

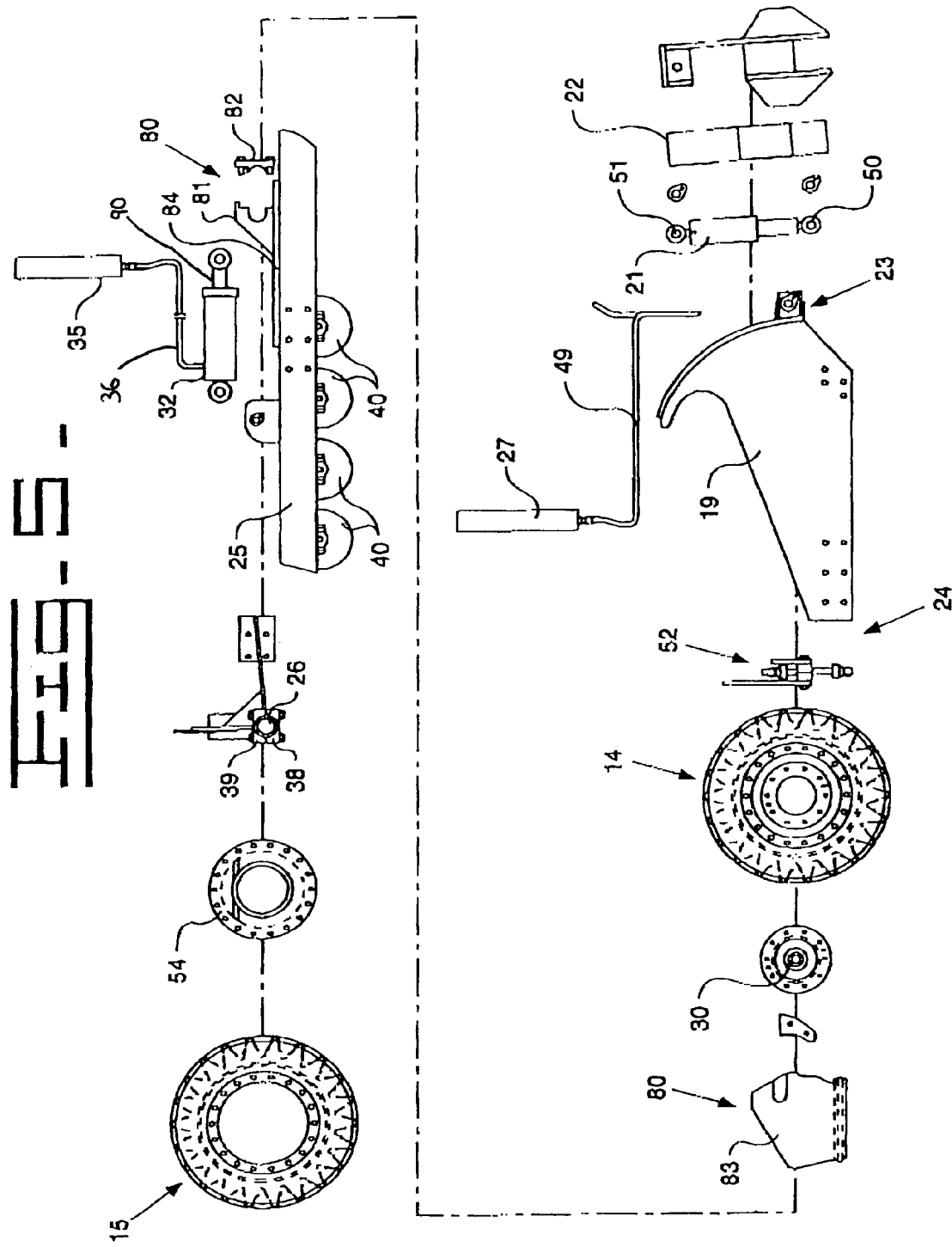

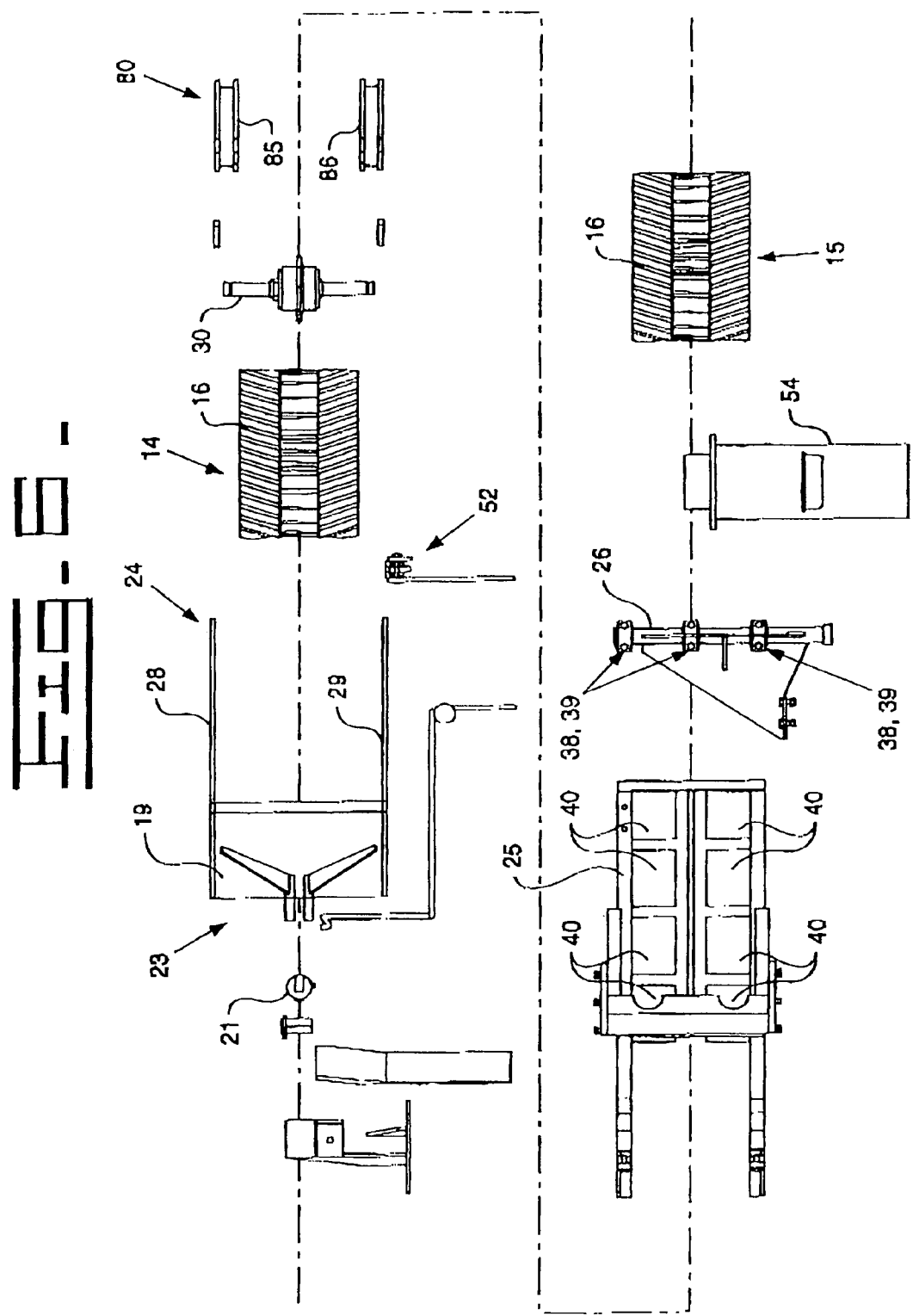

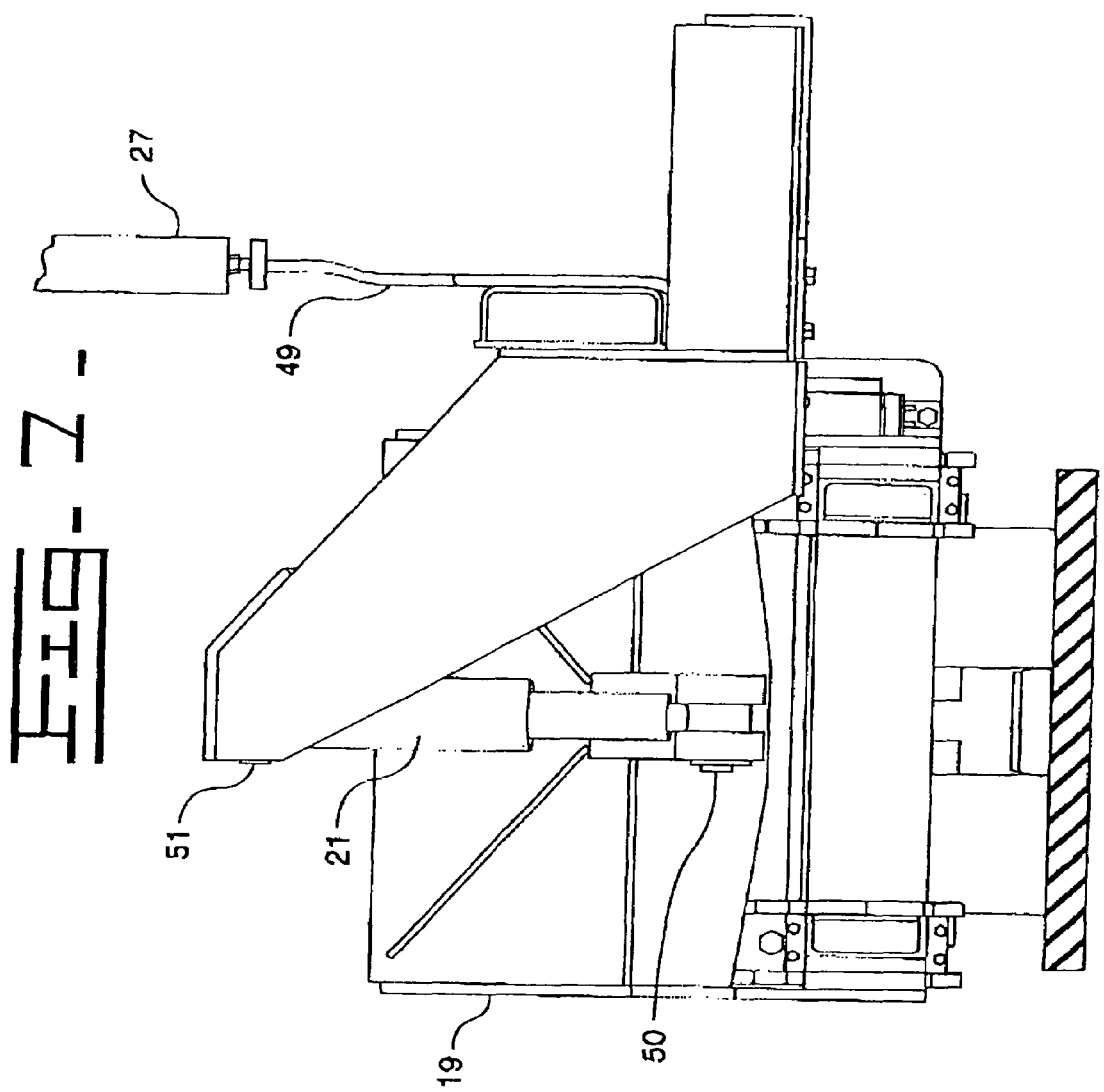

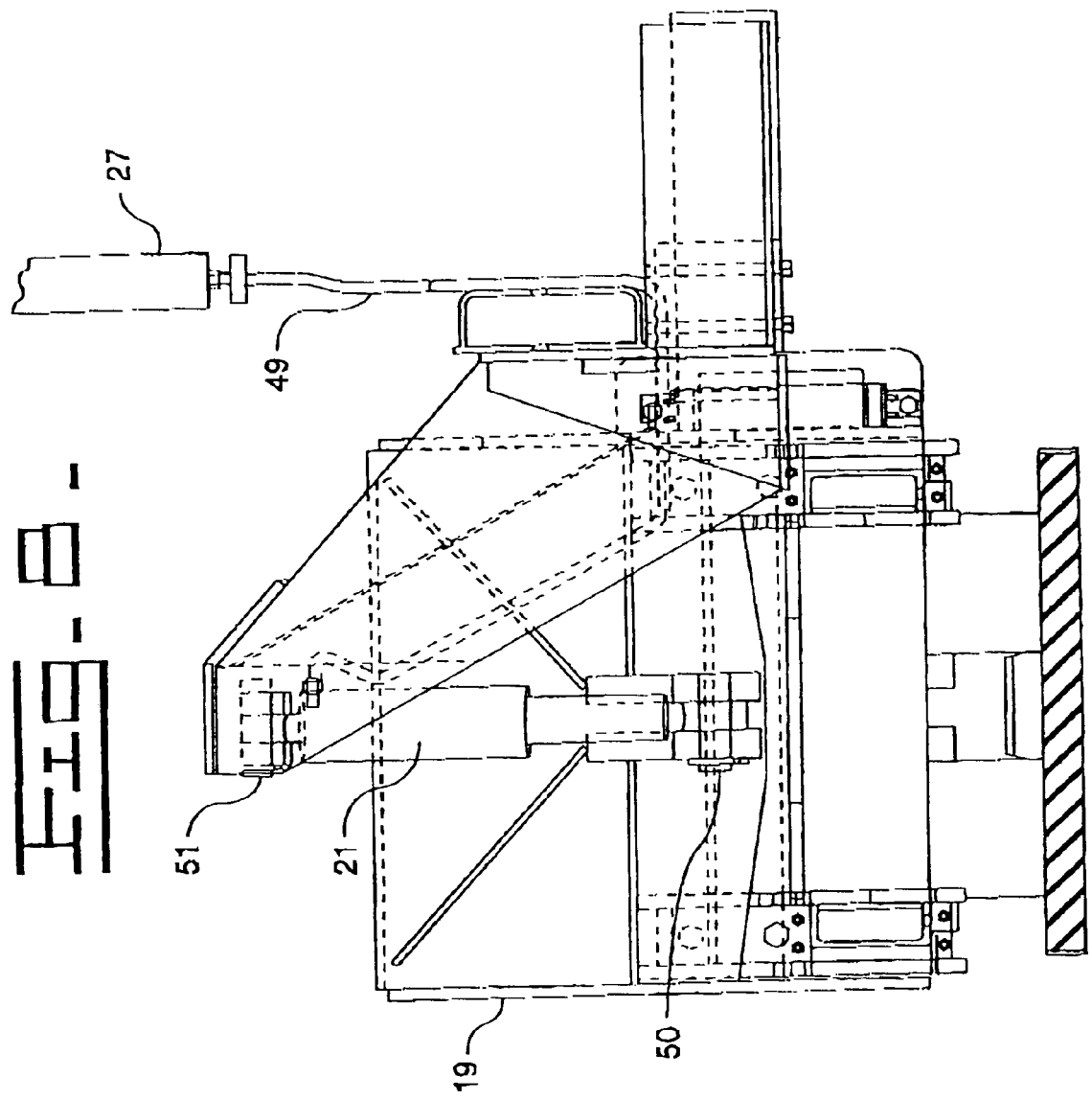

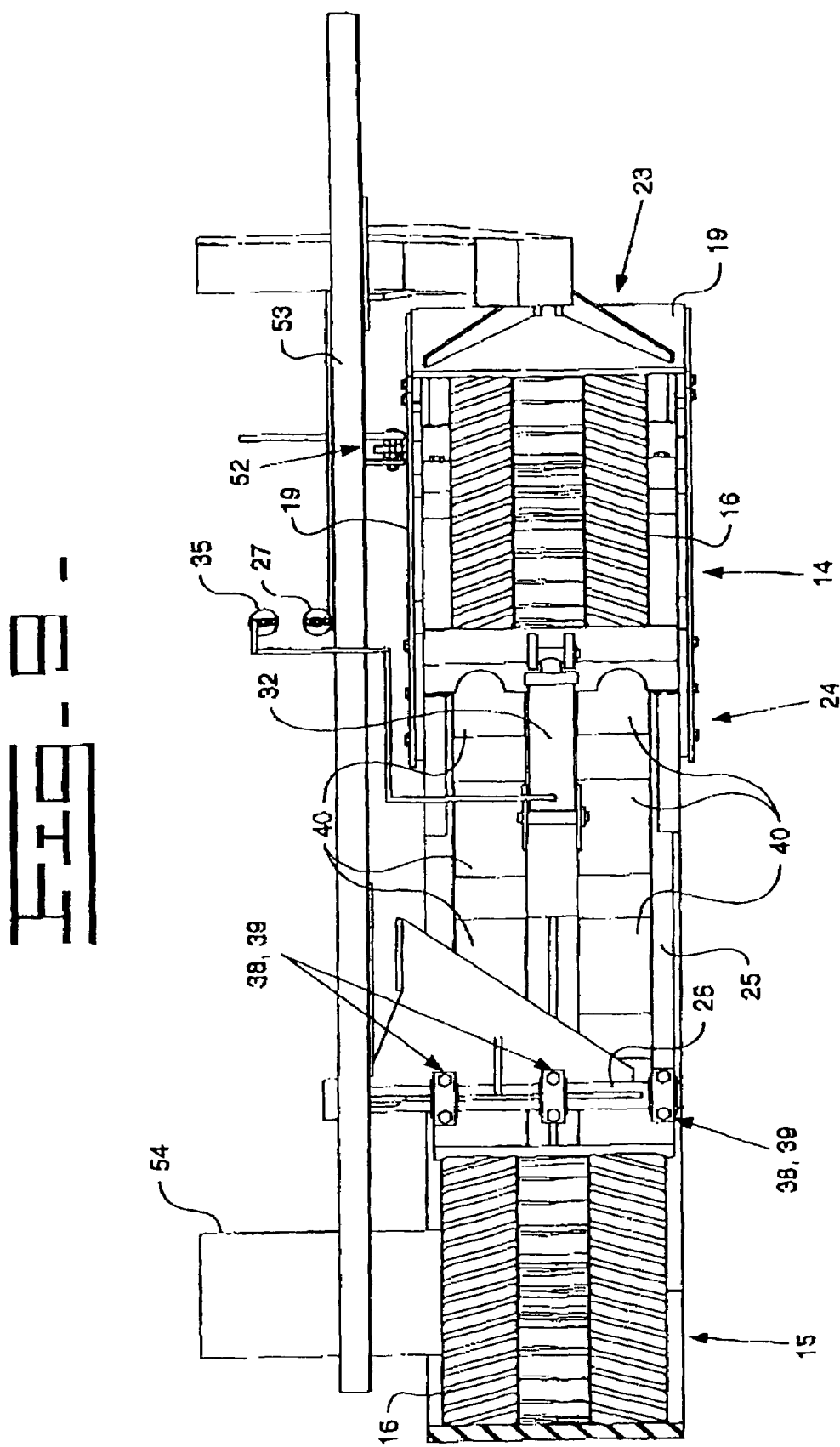

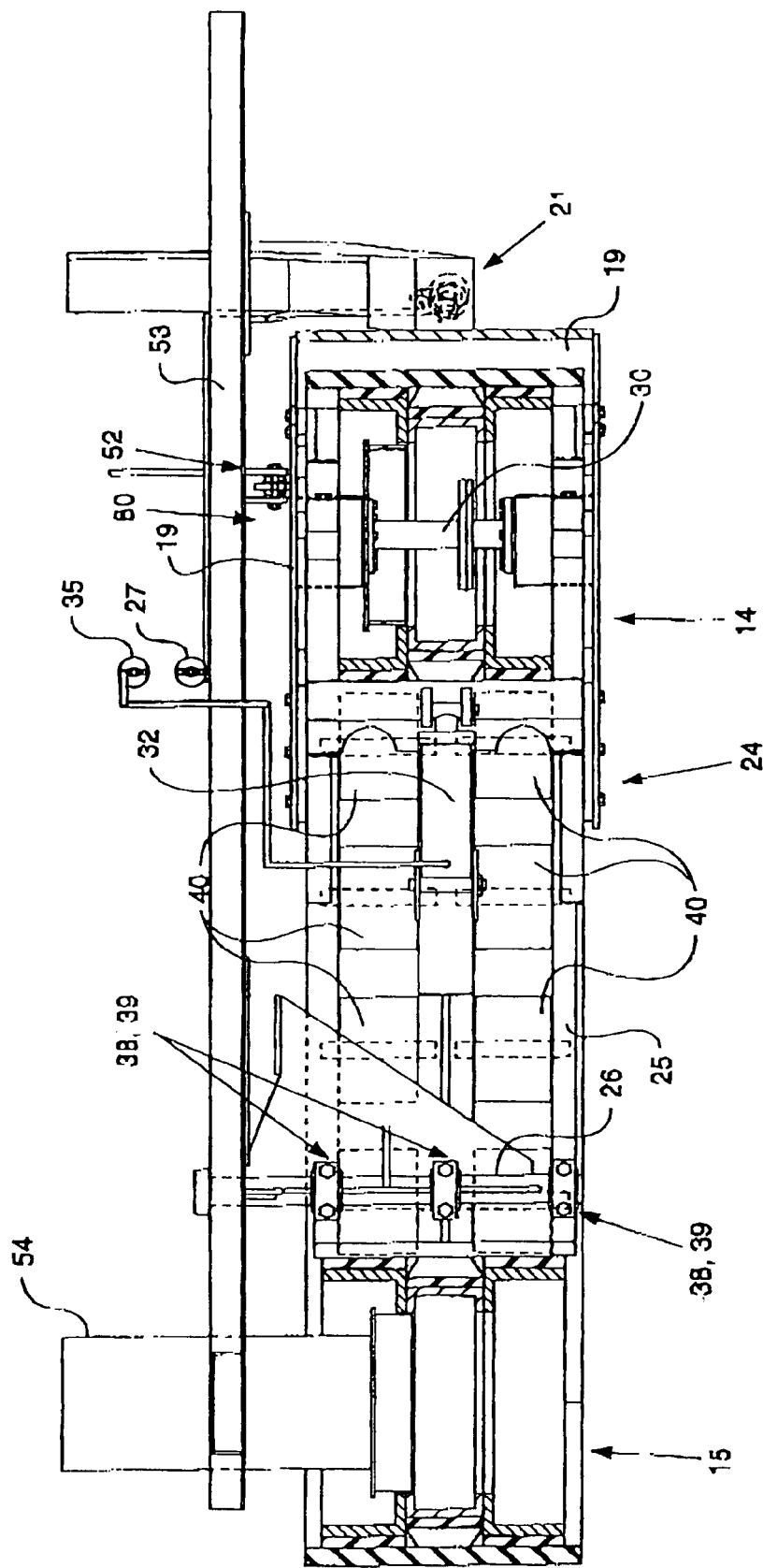

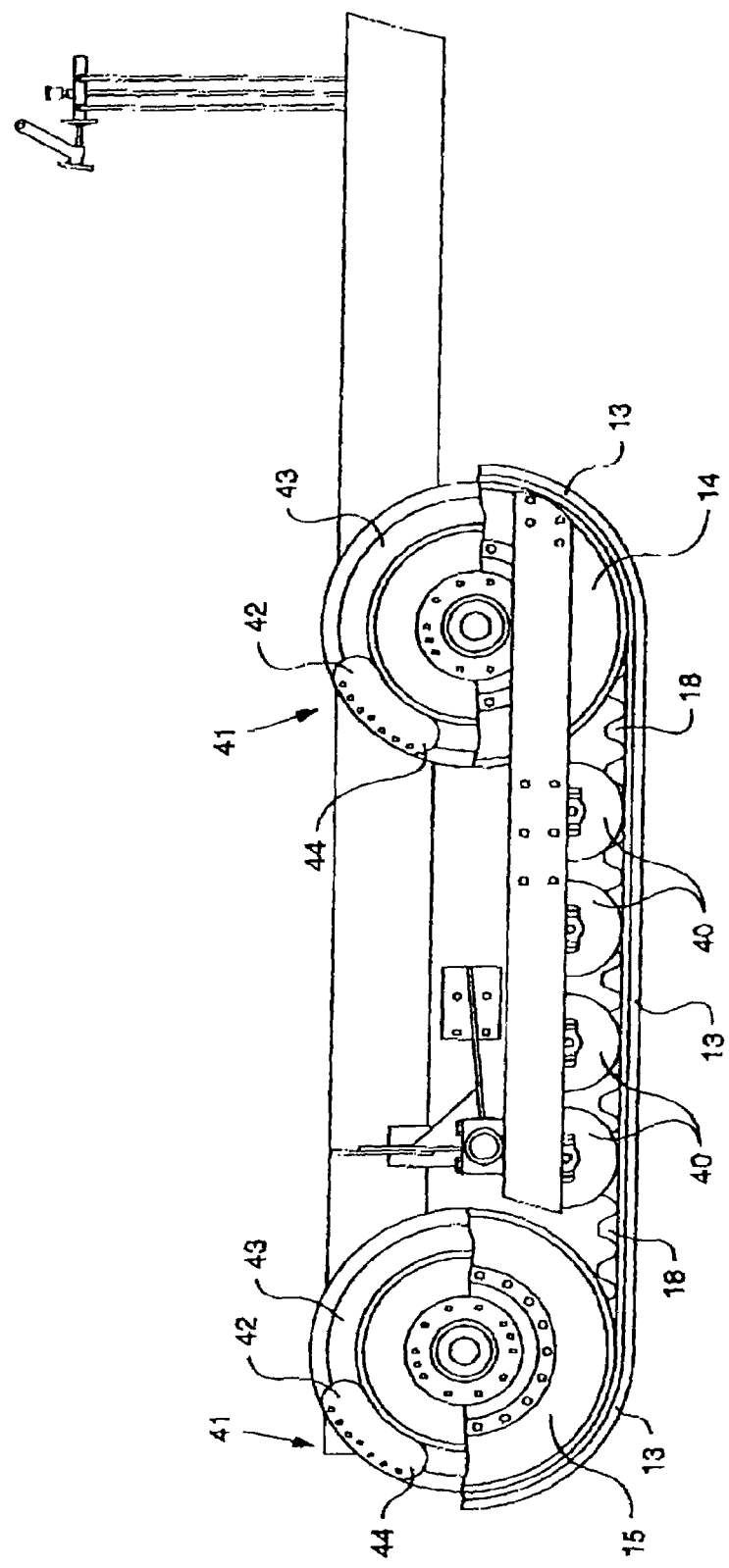

SUSPENSION SYSTEM, POSITIVE DRIVE BELT SYSTEM AND BELT TENSIONING DEVICE FOR WHEEL AND BELT DRIVEN DEVICES

CROSS-REFERENCE TO RELATED APPLICATIONS

This application is a continuation of U.S. patent application Ser. No. 10/608,656, filed Jun. 27, 2003, now U.S. Pat. No. 6,860,571, which claims the benefit of U.S. Provisional Application No. 60/392,155, filed on Jun. 27, 2002.

TECHNICAL FIELD OF THE INVENTION

The present invention relates generally to a wheel and belt or track driven device, and more particularly to a suspension system, positive hydraulical four wheel disc braking system, positive drive belt system, and belt tensioning device for wheel and belt devices.

DESCRIPTION OF THE RELATED ART

The popularity and nearly universal acceptance of wheel propulsion systems rather than track systems in agricultural use has stemmed primarily from the past track system's "rough ride," relatively higher noise levels, higher initial cost, lower maximum travel speed and inability to transport itself on improved road surfaces without inflicting damage thereto.

Present day track systems have overcome the majority of these objections by utilizing a propulsion system in which a continuous rubber belt encompasses a pair of wheels. Problems encountered in actually reducing such belt systems to practice include how to drive such belt with the entrained wheels, how to maintain structural integrity of the belt and wheels, how to encompass the belt in lateral alignment with the wheels when the wheels are subjected to large lateral loads, how to provide long life for the belt and wheels, how to accommodate debris ingested between the wheels and belt while maintaining the driving relationship therebetween without damaging either, how to preclude the belt from coming off the wheels, how to brake the belt and wheel systems, how to preclude the belt from coming off of the wheels during braking, and how to maintain proper belt tension during braking and turning.

Elastomeric belt systems have been used but they operate such that the elastomeric belt needs to be highly tensioned about a pair of wheels to provide frictional engagement with the wheels. Interposed between the wheels is a roller support system for distributing a portion of the weight and load imposed on the machine frame to the belt. The roller support system includes a mounting structure, which is pivotally connected to the machine frame and, therefore, free to rotate relative to the machine frame to accommodate undulations in the terrain surface while maintaining uniform ground pressure.

The frictional elastomeric drive belt system requires a higher belt tension than is required for a positive drive belt system. This higher belt tension causes premature failure of the belt. Further, the elastomeric suspension system only provides for a limited amount of suspension travel. This allows for an exorbitant amount of force being transferred to the frame and operator cabin when crossing rough terrain. Friction drive technology has many disadvantages. For example, track failure is common in wet and rocky conditions, and the track tends to fall off during braking and turning.

Current positive drive belt systems usually have only one wheel positively engaged with the belt causing premature wear when braking occurs. Further, known positive drive belt systems provide insufficient recoil to allow foreign material to escape from the belt system.

In addition, track driven systems are "hard" riding. Specifically, track driven systems lack suspension systems entirely or have primitive suspension systems resulting in a rough ride.

The present invention is directed to overcome one or more of the problems as set forth above.

SUMMARY OF THE INVENTION

The present invention includes a novel independent suspension for use in conjunction with a positive drive belt system, belt tensioner adapted for use with a positive drive belt system, drive wheel for use in conjunction with a positive drive belt system, and positive braking system for use with a positive drive belt system.

There present invention also includes a plurality of middle rollers for use with a positive drive belt system, wherein the group of middle rollers aid in the support of the wheel and belt device and provides a low ground pressure distribution.

The present invention further includes an independent suspension system, a positive drive system, and a belt tensioner system for use on a track system.

BRIEF DESCRIPTION OF THE DRAWINGS

These and other features and advantages of the present invention will be better understood by reading the following detailed description, taken together with the drawings wherein:

FIG. 2 is a side view according to FIG. 1 but with phantom lines illustrating hidden components of the track driven device;

FIG. 5 is an exploded, side view of one side of the track driven device having the suspension system, belt tensioner system, positive braking system and positive drive system thereon according to FIG. 1;

FIG. 6 is an exploded, top view of one side of the track driven device having the suspension system, belt tensioner system, positive braking system and positive drive system thereon according to FIG. 1;

FIG. 7 is a front view of one side of the track driven device having the suspension system, belt tensioner system, positive braking system and positive drive system thereon according to FIG. 1;

FIG. 8 is a front view of one side of the track driven device having the suspension system, belt tensioner system, positive braking system and positive drive system thereon according to FIG. 5 but with phantom lines illustrating hidden components of the track driven device;

FIG. 9 is a top view of one side of the track driven device having the suspension system, belt tensioner system, positive braking system and positive drive system thereon according to FIG. 1;

FIG. 10 is a top view of one side of the track driven device having the suspension system, belt tensioner system, positive braking system and positive drive system thereon according to FIG. 9 but with phantom lines illustrating hidden components of the track driven device;

FIG. 11 is a side view of the lower section of the track driven device with cutouts showing a hydraulically operated four-wheel disc braking system thereon;

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. Additionally, the present invention contemplates that one or more of the various features of the present invention may be utilized alone or in combination with one or more of the other features of the present invention.

Figure 1:
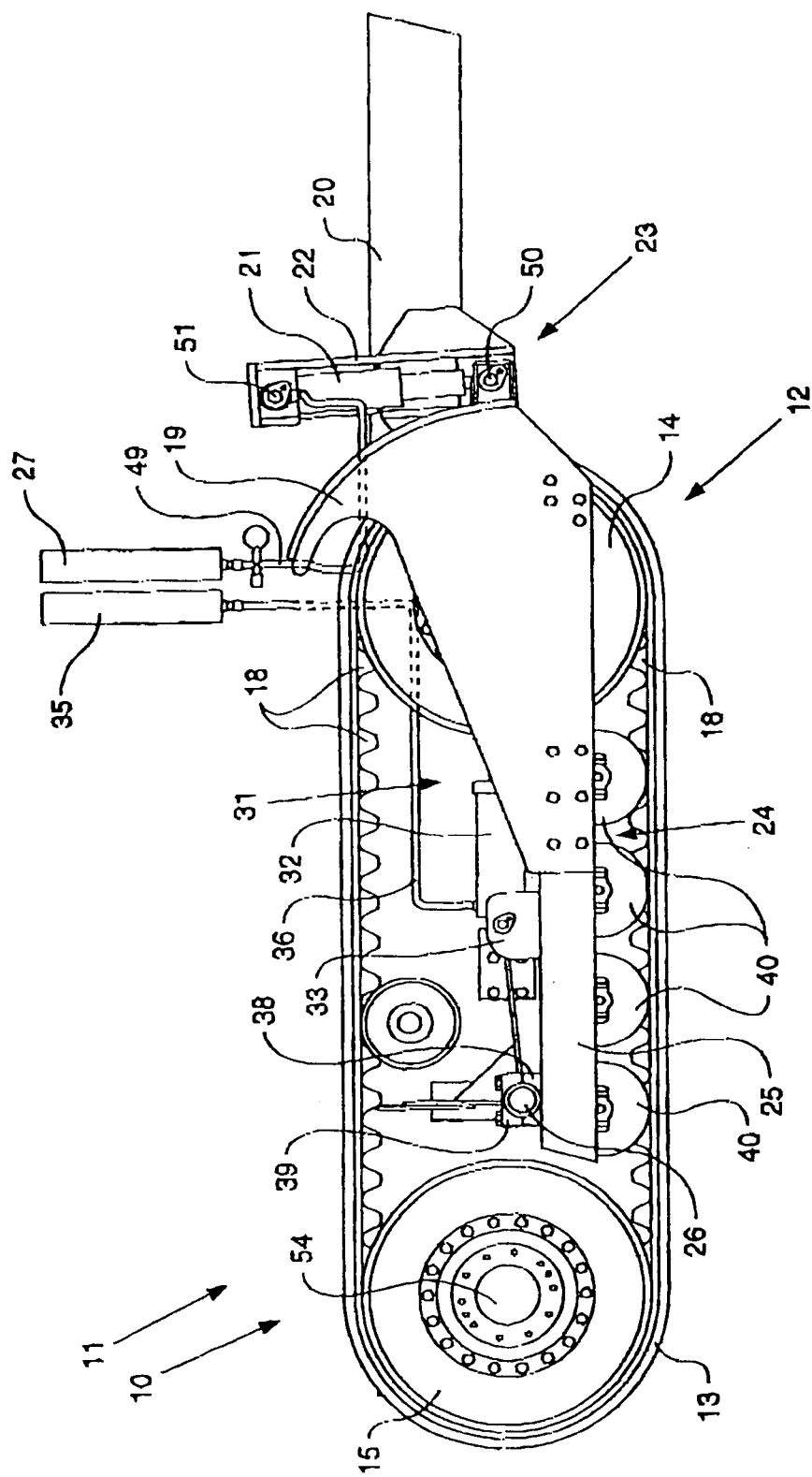
FIG. 1 is a side view of a lower section of a track driven device having a suspension system, belt tensioner system, positive braking system and positive drive system thereon according to the present invention.

Referring now to the drawings, wherein like reference numerals designate identical or corresponding parts throughout the several views, FIGS. 1 & 2 show a lower section 11 of a track driven device 10. The track driven device 10 has two belts 13 each encompassing an idler wheel 14 and a drive wheel 15. The drive wheels 15 drive the belts 13. The drive wheels 15 are powered by an engine, a transmission system, and other components substantially similar to a CATERPILLAR® brand Challenger® system.

Figure 4:
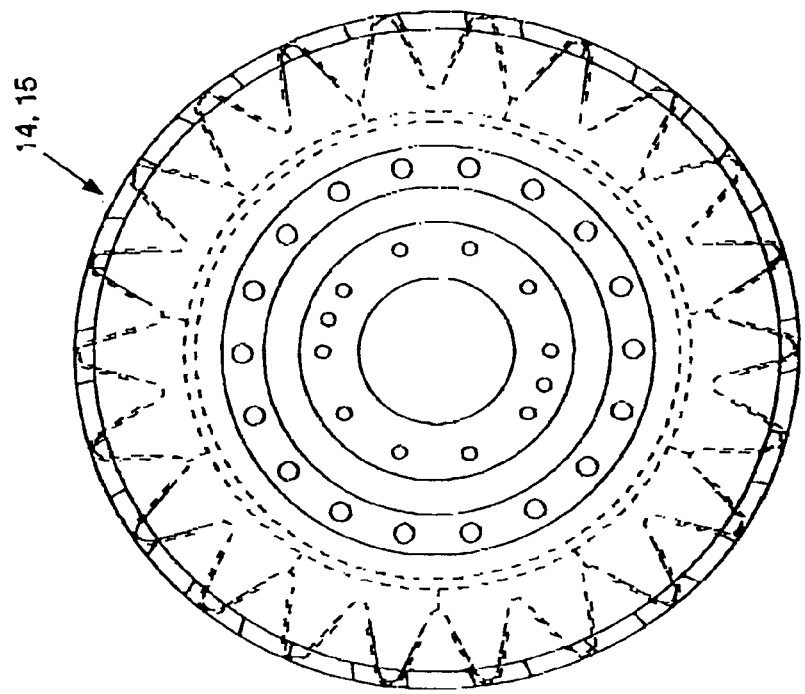
FIG. 4 is a side view of the wheel shown in FIG. 3 for the track driven device.
Figure 3:
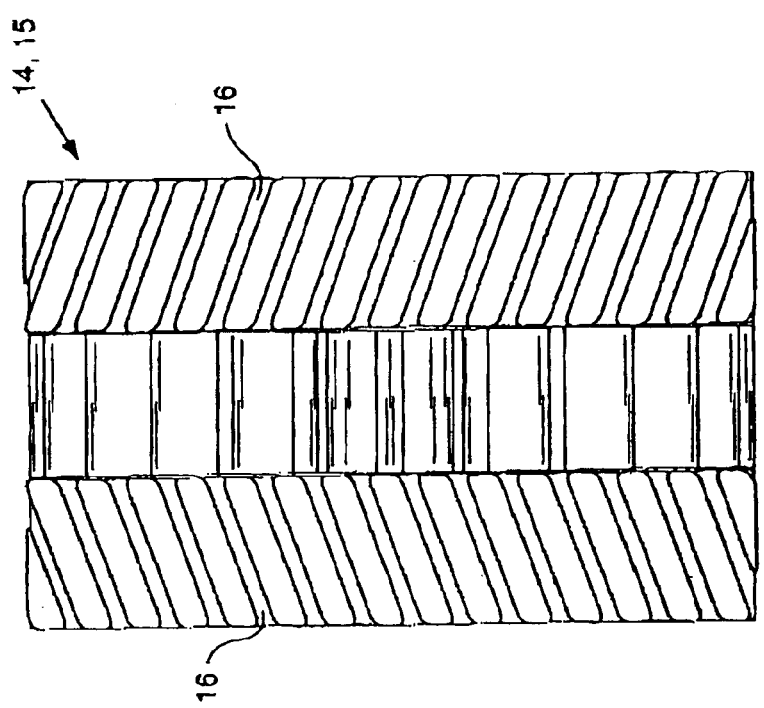
FIG. 3 is a front view of a wheel for the track driven device shown in FIGS. 1 and 2.
Figure 12:
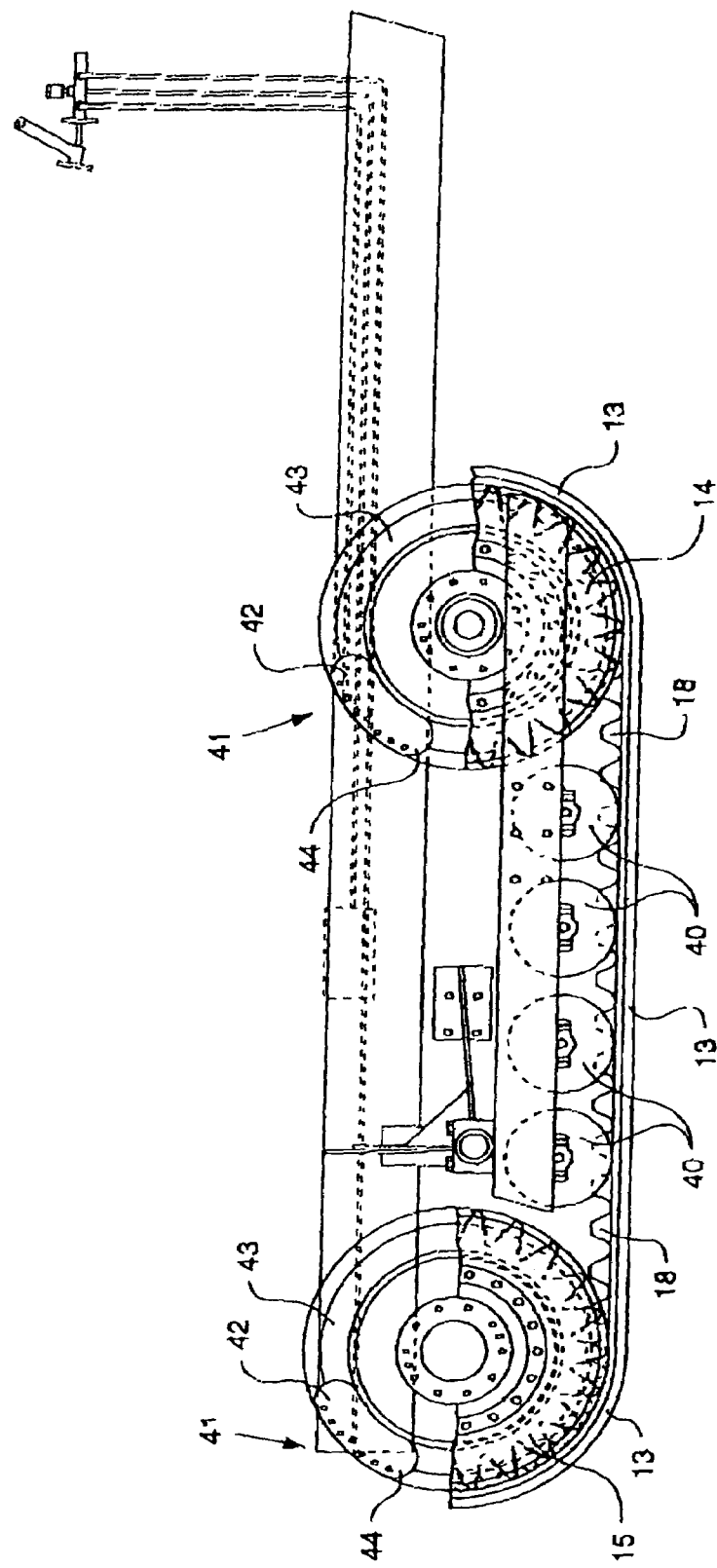
FIG. 12 is a side view according to FIG. 11 but with phantom lines illustrating hidden components of the track driven device.
Figure 13:
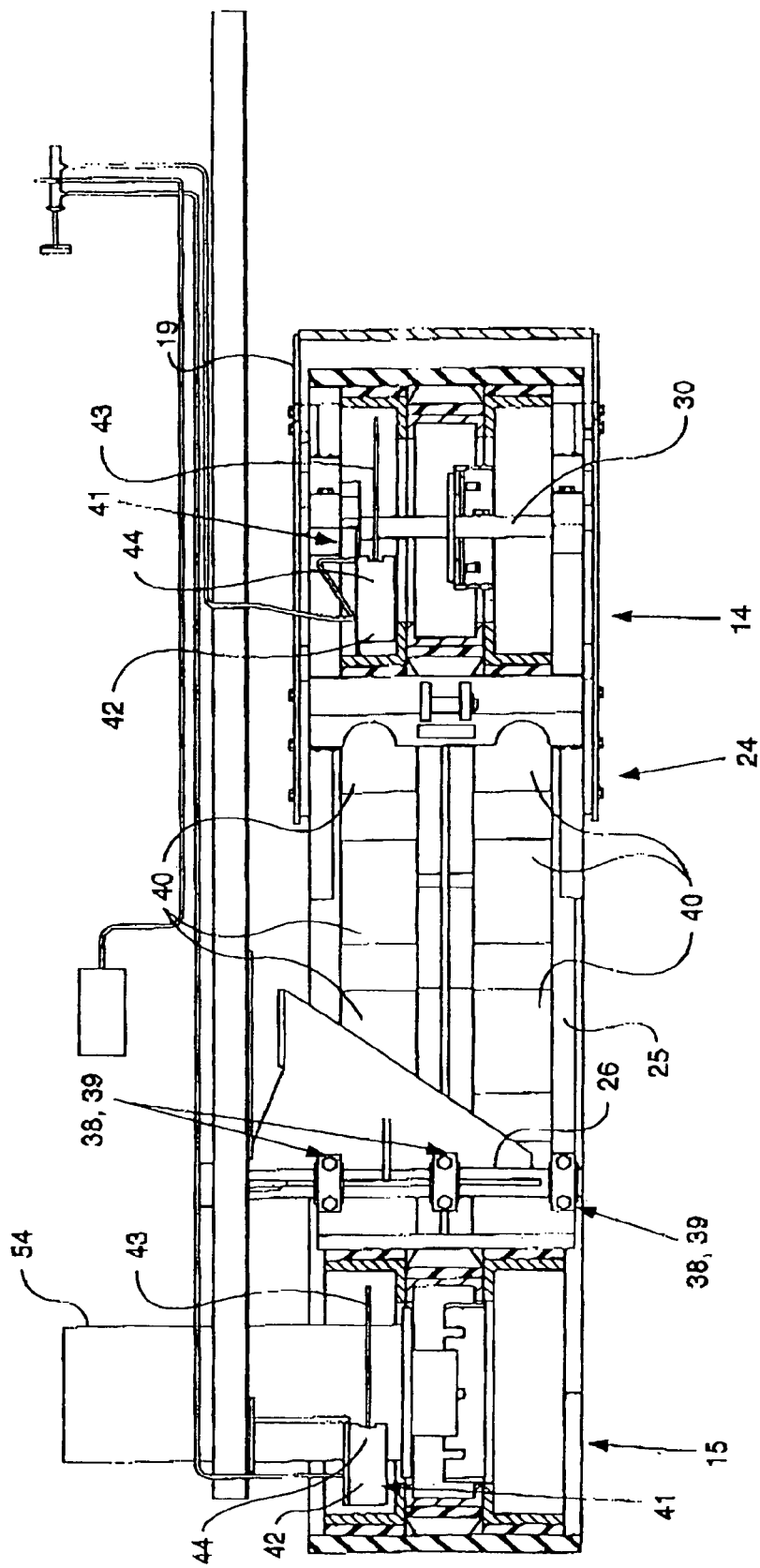
FIG. 13 is a top view of one side of the braking system according to FIG. 9 with cross-sections through the wheels.
Figure 14:
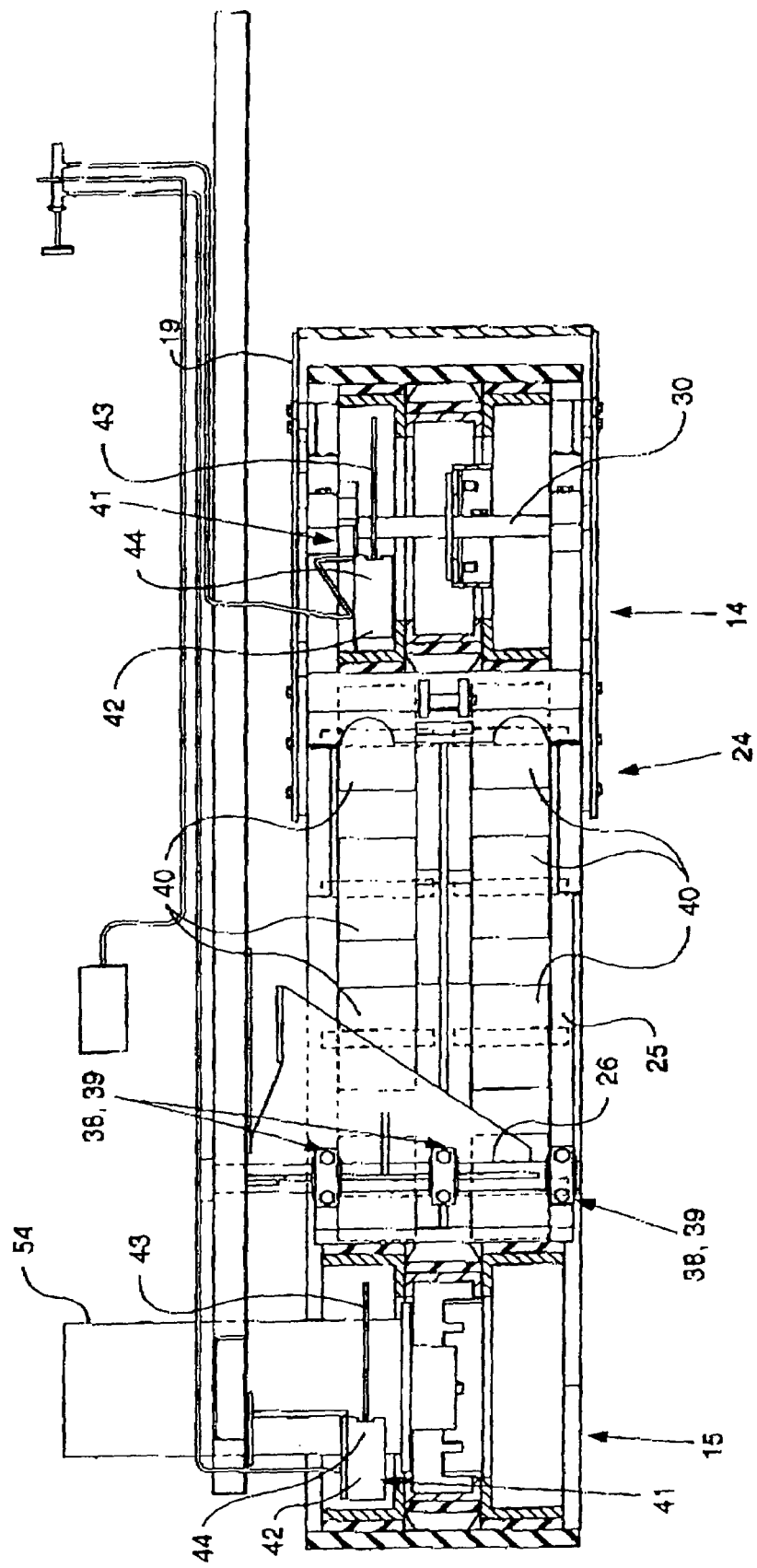
FIG. 14 is a top view according to FIG. 13 but with phantom lines illustrating hidden components of the track driven device.
Figure 15:
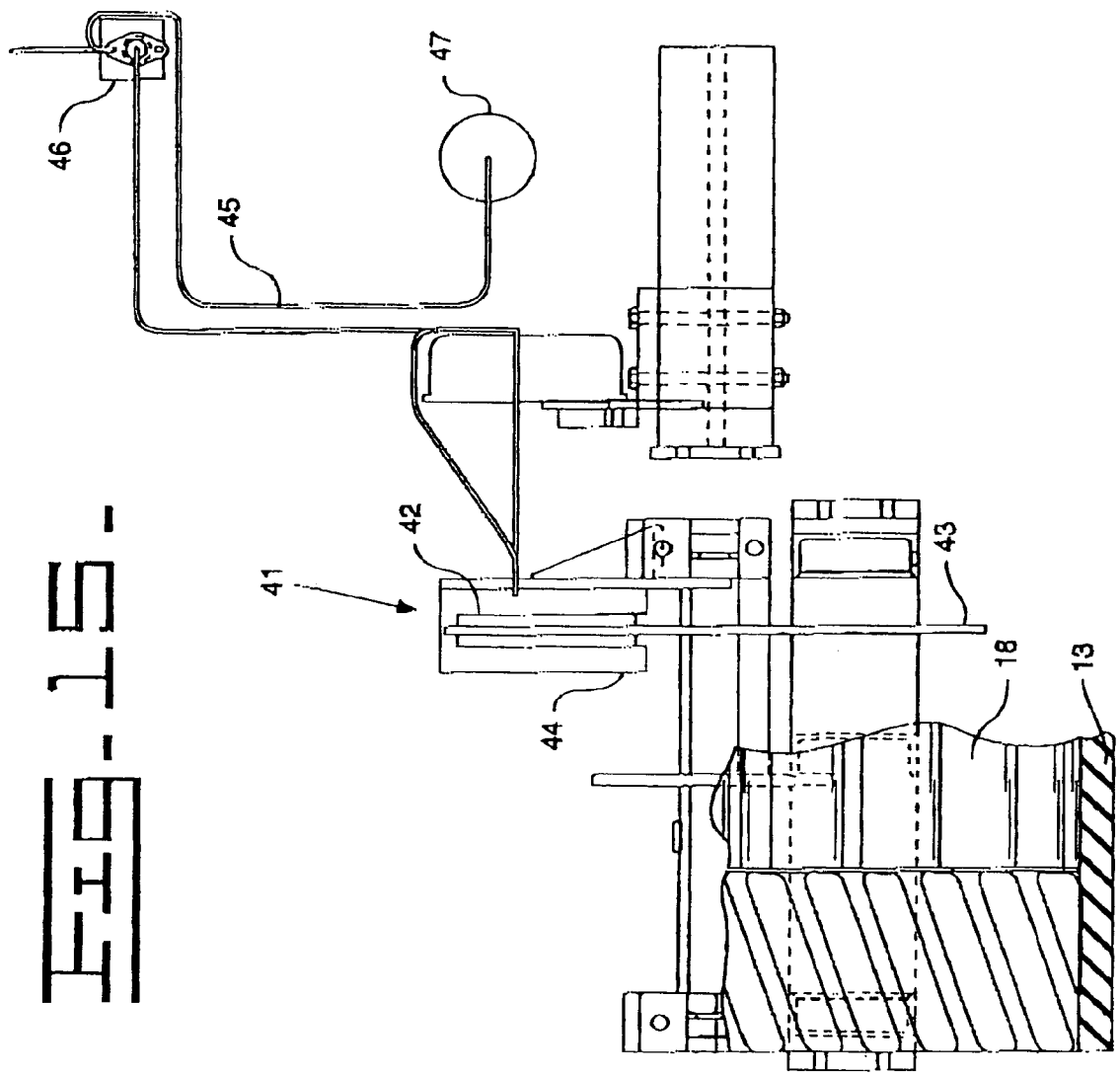
FIG. 15 is a top view according to FIG. 12 isolating one of the disc brakes.

Referring now to FIGS. 3 & 4, the idler wheels 14 and the drive wheels 15 are shown. In the preferred embodiment, the idler wheels 14 are 26 inches in width by 41.05 inches in diameter, and the drive wheels 15 are 29 inches in width by 41.05 inches in diameter, although such dimensions are not a limtation of the present invention. The idler wheels 14 and the drive wheels 15 have front windows or openings 16 in the circumference. In an alternative embodiment, side windows (not shown) are provided in the side of the wheels 14, 15. The windows 16 allow snow, ice, soil, rocks and other foreign matter to pass freely during operation. In addition, the front windows 16 are used to receive lugs 18 on belts 13, best shown in FIGS. 1 & 2. The lugs 18 enter the front windows 16 in much the same way that meshing gears interact with one another. As the drive wheels 15 rotate, the lugs 18 mate with the front windows 16, and the belts 13 are positively driven by the drive wheels 15. In an alternative embodiment, there are no windows 16 in the wheels 14, 15; rather, the wheels 14, 15 and the lugs 18 mate in much the same way as two gears mesh.

A suspension system 12 is operatively mounted to each side of the lower sections 11 of the track driven device 10. The suspension systems 12 provide independent suspension for the belts 13. The suspension systems 12 absorb load stresses and allows the idler wheel 14 to move vertically when an object is encountered providing a more comfortable, controlled and safe ride while prolonging the life of the track driven device 10.

Although it is understood that the track driven device 10 has two belts 13 and two suspension systems 12, the description that follows describes one side of the track driven device 10. Referring in combination to FIGS. 1 & 2, the suspension system 12 has a lower suspension bracket 19. The lower suspension bracket 19 has front ends 23 that are operatively connected to a frame 20 of the track driven device 10 via a suspension cylinder 21 and upper suspension bracket 22. The suspension cylinder 21 has a first end 50 operatively attached to the lower suspension bracket 19 and a second end 51 operatively attached to the upper suspension bracket 22. The upper suspension bracket 22 is operatively attached to the frame 20.

FIGS. 5 and 6 show the idler wheel 14 rotatably mounted between a first side 28 and a second side 29 of the lower suspension bracket 19 via an axle 30. The lower suspension bracket 19 has distal ends 24 operatively attached to a main frame 25. The main frame 25 is pivotally mounted to a track frame pivot 26. The track frame pivot 26 is operatively attached to the main frame 25. The track frame pivot 26 extends from one side of the main frame 25 to the other side for each suspension system 12. The track frame pivot 26 is operatively connected to the main frame 25 via a bearing cup 38 and a bearing cap 39. Ends of the track frame pivot 26 ride in the bearing cup 38 and the bearing cap 39. To hold the track frame pivot 26 in place, the bearing cap 39 is bolted over the track frame pivot 26 to the bearing cup 38. In the preferred embodiment, the bearing cap 39 and the bearing cup 38 are lined with neoprene rubber. The track frame pivot 26 is preferably a steel bar but other materials could be substituted.

The suspension cylinder 21 is generally readily available and one such cylinder is made by Caterpillar Industrial Products, Inc. in Peoria, Ill. under Part No. 151-1179. The suspension cylinder 21 is hydraulically connected to an accumulator 27 via a suspension pressure line 49 to provide suspension travel and load support. Preferably, the accumulator 27 is a high capacity nitrogen accumulator. The accumulator 27 is available over-the-counter and one such accumulator is made by Caterpillar Industrial Products, Inc. in Peoria, Ill. under Part No. 7U5050. It is obvious to those with ordinary skill in the art that other cylinders and accumulators could be substituted for these specific cylinders and accumulators.

When the idler wheel 14 encounters an object, the idler wheel 14 moves upwardly and the suspension cylinder 21 absorbs the initial shock of the object. During this upward movement, the suspension system 12 pivots about the track frame pivot 26. On the downward movement, the suspension cylinder 21 precludes a rapid descent for a smooth ride. FIGS. 9 and 10 show a roller bearing or side thrust bearing 52 operatively attached between the lower suspension bracket 19 and an inside support 53 to prevent side bearing thrust movement. The side thrust bearing 52 allows the lower suspension bracket 19 to move up and down pivoting about the track frame pivot 26. The side thrust bearing 52 moves up and down and keeps the track frame from moving.

Referring now to FIGS. 1, 2, 9 and 10, a track belt tensioner 31 is used to maintain tension on the belt 13 between the idler wheel 14 and the drive wheel 15. The amount of tension in the belt 13 is determined by the horizontal distance between the idler wheel 14 and the drive wheel 15. The drive wheel 15 is rotatably mounted about a powered axle 54, and the idler wheel 14 is rotatably mounted to a yoke 80 via the axle 30.

Referring now to FIGS. 5 & 6, the yoke 80 includes a first axle bracket 81 and a second axle bracket 82 for supporting the rotating axle 30. A yoke housing 83 is operatively attached to the first and second axle brackets 81, 82. The yoke 80 has guide member 84 moveably mounted to a top surface of the main frame 25, and the yoke 80 moves horizontally along the main frame 25 when urged by a track tension cylinder 32. The yoke 80 has a first track guide 85 and a second track guide 86 that surrounds the main frame 25. The first and second track guides 85, 86 are attached to the first and second axle brackets 81, 82 and the yoke housing 83, and the first and second track guides 85, 86 keep the yoke 80 on the main frame 25 during the back and forth horizontal movement. The idler wheel 14 and the yoke 80 move along a horizontal axis via the track tension cylinder 32.

A piston rod 90 from the track tension cylinder 32 extends moving the idler wheel 14 and the yoke 80 backward and forward, thereby adding tension on the belt 13. When the piston rod 90 is retracted, the idler wheel 14 and the yoke 80 are moved closer to the drive wheel 15, thereby reducing the tension on the belt 13. The idler wheel 14 is encapsulated in the lower suspension bracket 19, and the lower suspension bracket 19 keeps the belt 13 from falling off of the wheels 15, 15. During the extension and retraction of the piston rod 90 from the track tension cylinder 32, the yoke 80 slides on the track frame 20. Once again, the position of the yoke 80 along with the idler wheel 14 is adjusted horizontally via the track tension cylinder 32 to adjust the belt 13 tension. In addition to adjusting the horizontal position of the yoke 80 to adjust the belt 13 tension, the lower suspension bracket 19 pivots in the vertical direction as previously described. The lower suspension bracket 19 pivots about the track frame pivot 26 but does not move horizontally with the yoke 80.

The combination of the suspension cylinder 21 and the track tension cylinder 32 absorbs the shock placed on the idler wheel 14. This shock absorption prevents the belt 13 from tearing and falling off the idler wheel 14 and the drive wheel 15 and also provides a smooth ride.

The track belt tensioner 31 has the track tension cylinder 32. The track belt tensioner 31 is operatively mounted to the frame 20 via a cylinder bracket 33. The cylinder bracket 33 is welded to the lower suspension bracket 19. A first end of the track tension cylinder 32 is pinned to the cylinder bracket 33. A second end of the track tension cylinder 32 has the piston rod 90 for adjusting the yoke 80 and the idler wheel 14 in the horizontal direction. The piston rod 90 is operatively mounted to a piston cylinder bracket 34. In the preferred embodiment, the piston cylinder bracket 34 is triangular as viewed from the side and welded to the frame 20. The track tension cylinder 32 is hydraulically connected to a tension accumulator 35 to provide belt 13 tensioning and a smooth ride. The tension accumulator 35 is preferably mounted above the track tension cylinder 32. It is important to note that in the preferred embodiment, there is one tension accumulator 35 and one track tension cylinder 32 per belt 13; however, the track tension cylinders 32 could be connected to one accumulator. In yet another embodiment, the track tension cylinders 32 and the suspension cylinder 21 are connected to one accumulator.

The tension accumulator 35 is hydraulically connected to the track tension cylinder 32 via a hose 36. The track tension cylinder 32 is, preferably, a tow large-bore, long-stroke cylinder to provide excellent cushioning and dampening. J.R. Schneider Company, is located at 849 Jackson Street, Benicia, Calif., 94510 and provides a suitable cylinder under the name BAILEY330™ Part No. 216-141. Preferably, the tension accumulator 35 is a high capacity nitrogen accumulator. The tension accumulator 35 can be purchased from DYNA TECH, A Neff Company, located at 1275 Brume Elk Grove Village, Ill., 60007, and provides a suitable accumulator under Part No. A2-30-E-OSG-BTY-MIO. It is obvious to those with ordinary skill in the art that other cylinders and accumulators could be substituted for these specific cylinders and accumulators.

The tension on the belt 13 needs to be set after the belt 13 is assembled on the idler wheel 14 and the drive wheel 15. To set the tension, hydraulic fluid is added to the track belt tensioner 31 until the gauge on the track tension cylinder 32 reads 10,000 pound per square inch. The tension accumulator 35 is pre-charged at 600 pounds per square inch with nitrogen.

The combination of the suspension system 12 and the track belt tensioner 31 provides independent track suspension. When an object is encountered by the idler wheel 14, the idler wheel 14 is allowed to move vertically and horizontally because of the suspension system 12 and the track bolt tensioner 31, respectively.

Referring now to FIGS. 1, 2 and 5, middle rollers 40 are shown. The middle rollers 40 are rotatably mounted to the frame 20 and fixed; the middle rollers 40 are not capable of moving up and down or back and forth. In the preferred embodiment, there are eight middle rollers 40 per belt 13. There are four middle rollers 40 along the outside of the belt 13, and there are four middle rollers 40 along the inside of the belt 13. The eight middle rollers 40 are weight bearing and, thus, provide a low ground pressure design and are load bearing rollers. The middle rollers 40, preferably, are 21 inches in diameter by 2-5 inches in width fork truck wheels press on wheels. Suitable middle rollers 40 are available through Caterpillar Industrial Products, Inc. under Part No. 120-5746. In arctic use, the ground contacting surfaces of the middle rollers 40 are coated with rubber. Normally, the middle rollers 40 are made with solid rubber. The middle rollers 40 are beveled on one side to match the bevel of the cog of the rubber track.

Referring now to FIGS. 11-15, a braking system 41 for positive braking is shown. The braking system 41 has calipers 42, preferably four. The calipers 42 are used on each of the four wheels 14, 15.

There are two calipers 42 for each belt 13 system (i.e., one caliper 42 for the idler wheel 14 and one caliper 42 for the drive wheel 15). The two calipers 42 operatively controlling the two idler wheels 14 are operatively mounted to the yoke 80. The two calipers 42 operatively controlling the two drive wheels 15 are mounted to the main frame 25. Large diameter discs 43 are operatively mounted to the idler wheels 14 and the drive wheels 15. The calipers 42 act on or contact the discs 43 causing the track driven device 10 to slow or stop. Dust covers 44 enclose the calipers 42. The braking system 41 results in positive braking due to the combination of lugs 18 on the belts 13 mating with the idler wheels 14 and the drive wheels 15. The lugs 18 enter the front windows 16 of the idler wheels 14 and the drive wheels 15 in much the same way that meshing gears interact with one another. As the calipers 42 work on the discs 43, the idler wheels 14 and the drive wheels 15 are slowed as a result of the front windows 16 acting on the lugs 18 thereby positively slowing or stopping the belts 13 from rotating about the idler wheels 14 and the drive wheels 15.

In the braking system 41, hydraulic pumps 47 supply hydraulic fluid to a master cylinder 46 via brake lines 45. The hydraulic pump 47 is a mechanically driven hydraulic pump. Supply lines 48 provide pressurized hydraulic fluid from the master cylinder 46 to the calipers 42. The operation of the braking system 41 is readily apparent by the elements previously described.

Modifications and substitutions by one of ordinary skill in the art are considered to be within the scope of the present invention, which is not limited except by the following claims.

What I claim is:

1. A track driven device having a plurality of belts, wherein each of the plurality of belts encompass a drive wheel and an idler wheel, said drive wheel for rotating the belt and idler wheel with the belt, the track driven device comprising: a plurality of positive drive belt systems for positively driving the plurality of belts, each of the plurality of positive drive belt systems having the drive wheel and the idler wheel encompassed by the belt, wherein the drive wheel and the idler wheel have apertures in their outer circumference, wherein the belt has a ground engaging surface and a wheel engaging surface, said wheel engaging surface having lugs thereon for mating with the apertures in the drive wheel and the idler wheel such that when the drive wheel rotates, the belt is positively driven; a plurality of suspension systems for absorbing load stresses, each of the plurality of suspension systems having a lower suspension bracket, said lower suspension bracket having a first end toward a front end of the track driven device and operatively mounted to a suspension cylinder and a distal end toward a middle section of the track driven device, each of the plurality of suspension systems operatively and pivotably mounted to a track frame pivot on a main frame of the track driven device, the idler wheel rotatably mounted between a first side and a second side of the lower suspension bracket such that when the idler wheel encounters an object or depression, the lower suspension bracket moves in a vertical direction and pivots about the track frame pivot thereby allowing the idler wheel to move vertically without moving the main frame proportionally vertical, and the vertical movement of the idler wheel dampened by the suspension cylinder; and a plurality of belt tensioning systems for maintaining tension on the plurality of belts, each of the plurality of belt tensioning systems having a track tension cylinder operatively mounted between an axle of the idler wheel and a cylinder bracket mounted to the main frame, wherein the track tension cylinder maintains tension on the belt by moving the axle of the idler wheel in a horizontal direction.

2. The track driven device according to claim 1, further comprising a plurality of middle rollers rotatably mounted to the main frame and between the idler wheel and the drive wheel.

3. The track driven device according to claim 2, wherein the idler wheels and the drive wheels have sides, said sides having openings therein for allowing foreign objects to pass therethrough.

4. The track driven device according to claim 2, wherein each of the plurality of suspension systems has a bearing cup and a bearing cap operatively mounted between track frame pivot and the main frame.

5. The track driven device according to claim 4, wherein the bearing cup and the bearing cap have inside surfaces for receiving the track frame pivot, and said inside surfaces are lined with neoprene rubber.

6. The track driven device according to claim 2, wherein the suspension cylinder has a suspension piston rod at a first end operatively attached to an upper suspension bracket, said upper suspension bracket operatively attached to the main frame, and wherein the suspension cylinder has a distal end operatively attached to the lower suspension bracket such that when the idler wheel encounters an object, said suspension cylinder dampens the vertical movement of the idler wheel.

7. The track driven device according to claim 6, further including an accumulator hydraulically connected to the suspension cylinder with a suspension pressure line for providing suspension travel and load support.

8. The track driven device according to claim 7, further including a side thrust bearing operatively attached to the lower suspension bracket and an inside support for precluding side bearing thrust movement but allowing vertical movement.

9. The track driven device according to claim 8, further including: a yoke having a first axle bracket and a second axle bracket for supporting the rotating axle; a guide member operatively attached to a bottom surface of the yoke, and wherein the guide member is positioned between the yoke and a top surface of the main frame; and wherein said yoke is operatively connected to the track tension cylinder, and said yoke is movable in the horizontal direction along the top surface of the main frame.

10. The track driven device according to claim 9, further including a first track guide operatively attached to the first axle bracket, a second track guide operatively attached to the second axle bracket, and wherein the first track guide and the second track guide preclude the yoke from falling off of the main frame during movement.

11. The track driven device according to claim 10, further including a tension accumulator hydraulically connected to the track tension cylinder via a tension pressure line for providing belt tensioning.

12. The track driven device according to claim 2, wherein the middle rollers have ground contacting surfaces coated with rubber.

\* \* \* \* \*